United States Patent
Walesa et al.

(10) Patent No.: US 7,997,753 B2
(45) Date of Patent: Aug. 16, 2011

(54) DUAL MODE PORTABLE LIGHTING SYSTEM

(76) Inventors: Phillip Walesa, Wauwatosa, WI (US);
Kevin McDermott, Oak Creek, WI (US); Behrom Rowhani, Milwaukee, WI (US); Steven Smitts, Omro, WI (US)

(*) Notice: Subject to any disclaimer, the term of this patent is extended or adjusted under 35 U.S.C. 154(b) by 108 days.

(21) Appl. No.: 12/407,667

(22) Filed: Mar. 19, 2009

(65) Prior Publication Data
US 2010/0237263 A1    Sep. 23, 2010

(51) Int. Cl.
*F21L 4/00* (2006.01)
(52) U.S. Cl. ......... 362/191; 362/231; 362/183; 362/184
(58) Field of Classification Search ............. 362/20, 362/183, 184, 186, 191, 194, 200–202, 205, 362/208, 231, 236, 240, 249.01, 249.11, 362/276, 363, 382, 393, 394, 395, 410, 414, 362/431, 449, 450, 540, 542–545, 800, 802, 362/249.02, 249.03, 249.05, 249.07
See application file for complete search history.

(56) References Cited

U.S. PATENT DOCUMENTS

| | | | | |
|---|---|---|---|---|
| 5,319,365 A | * | 6/1994 | Hillinger | 340/908.1 |
| 5,585,783 A | * | 12/1996 | Hall | 340/473 |
| 6,567,248 B1 | * | 5/2003 | Schmidt et al. | 362/470 |
| 6,752,515 B2 | | 6/2004 | Evans et al. | |
| 6,902,294 B2 | * | 6/2005 | Wright | 362/191 |
| 6,986,589 B2 | | 1/2006 | Evans et al. | |
| 7,045,975 B2 | | 5/2006 | Evans | |
| 7,178,767 B2 | * | 2/2007 | Steyn et al. | 248/163.1 |
| 7,222,451 B2 | * | 5/2007 | Keng et al. | 42/94 |
| 7,355,349 B2 | | 4/2008 | Evans | |
| 7,452,099 B2 | | 11/2008 | Evans et al. | |
| 7,470,036 B2 | | 12/2008 | Deighton et al. | |
| 7,500,675 B2 | * | 3/2009 | Sandman | 273/400 |
| 7,536,156 B2 | * | 5/2009 | Tischer et al. | 455/90.3 |
| 2002/0005826 A1 | * | 1/2002 | Pederson | 345/82 |

FOREIGN PATENT DOCUMENTS
WO    WO 9314971    *    8/1993

* cited by examiner

*Primary Examiner* — Hargobind S Sawhney
(74) *Attorney, Agent, or Firm* — Absolute Technology Law Group LLC

(57) ABSTRACT

The present invention is a portable lighting system comprised of a light head with visible white light and infrared light sources mounted on the center post of a quadpod. The quadpod has four adjustable, telescoping legs which are affixed to the center post using a collar mechanism. The collar mechanism allows the quadpod legs to be pivoted to a parallel position for storage. A power unit, which includes a battery, power supply and remote control receiver encased within a weather resistant housing, is located near the opposite end of the center post. A power cable connects the light head and the power unit. The portable lighting system is capable of being operating wirelessly using a handheld remote. The portable lighting system may be constructed from fiberglass, aluminum, a composite material or any other material or combination of materials.

10 Claims, 6 Drawing Sheets

DUAL MODE PORTABLE LIGHTING SYSTEM

FIELD OF INVENTION

This invention relates generally to the field of lighting systems and more specifically to portable lighting systems.

BACKGROUND

In 2008 the government issued a solicitation ("the solicitation") for various portable lighting equipment sets meeting the following standards known in the art. The portable illumination system (CLIN-0001) disclosed in the solicitation was required to include four light heads with a visible white light component (600 ft illumination), an infrared light component (300 ft by 300 ft illumination), and an adjustable beam to allow the user to define the amount of illumination based on the target field. The solicitation also required were light stands (four) with a two feet minimum height, standard rechargeable lithium ion batteries which can be operated continuously for a minimum of fifteen hours and which can be recharged in five hours or less, a battery charger capable of using any typically available electrical system, and a wireless remote control. The four lighting systems, excluding the battery charger, were also required to fit into lighting wheeled systems cases, each case having a weight of less than 50 lbs.

The solicitation also requested a quote for a second illumination system (CLIN-0003), the operations portable illumination system, must include two light heads with a visible white light component (1000 ft illumination), an infrared light component (1000 ft illumination), and an adjustable beam to allow the user to define the amount of illumination based on the target field. The light stands (two) for the operations portable illumination system must have a minimum height of five feet. Also required were standard rechargeable lithium ion batteries operable for a minimum of ten continuous hours and which can be recharged in five hours or less, a battery charger having two bays and capable of using any typically available electrical system, and the ability to control the illumination system using a wireless remote. Both lighting systems, excluding the battery charger, were required to fit into a single wheeled case weighing less than 80 lbs.

A quote was also requested for a third illumination system (CLIN-0004), an operations portable illumination single system must include a light head with a visible white light component (1000 ft illumination), an infrared light component (1000 ft illumination), and an adjustable beam to allow the user to define the amount of illumination based on the target field. The light stand (one) for the operations portable illumination system was required to have a minimum height of 6.5 ft. Also required were standard rechargeable lithium ion batteries operable for a minimum of thirty continuous hours, a battery charger having two bays and capable of using any typically available electrical system, and the ability to control the illumination system using a wireless remote. The lighting system, excluding the battery charger, must fit into a single wheeled case weighing less than 70 lbs.

The fourth illumination system requested was (CLIN-0009), a portable illumination four meter tower system must include two light heads with a visible white light component (1000 ft illumination), an infrared light component (1000 ft illumination), and an adjustable beam to allow the user to define the amount of illumination based on the target field. The light stand (one) for the operations portable illumination system must have a minimum height of 13.2 ft and be capable of being reinforced in the field for stability (e.g., via use of guy wires). Also required were a portable, lightweight, extremely quiet generator which operates at less than sixty decibels, uses regular or diesel fuel and operates for several hours on one tank, provides 120V AC power or 12V DC power, and weighs 50 lbs or less. The tower system was also required to include a wireless remote control and must fit into a wheeled case(s) weighing less than 250 lbs, ideally with each case weighing less than 50 lbs.

Additional lighting requirements for the portable illumination systems were night vision goggle mode, 300 feet human threat detection from the light source; visible-mode, light must be white and provide 0.2 foot candelas at 175 ft from the light source; adjustable light setting via a handheld remote control; and on/off, low, medium and high power settings.

Additional lighting requirements for the floodlight/contingency system were super bright white light which illuminates a minimum field of 600 ft with a desired objective of 1000 ft and at least 20.0 target luminance (fL) at 600 ft; a beam width of 24-34 degrees; adjustable light setting via a handheld remote; and on/off, low, medium and high power settings.

In addition to the four illumination systems, each system was required to have one or more spares kits including specified components (e.g., replacement batteries, power cables, replacement wireless remote).

The solicitation contemplated an effective and efficient design corresponding to military needs; however, certain opportunities existed to modify and optimize the structural design from the specifications disclosed in the solicitation. For example, it is known that heat is detrimental to the life of all batteries and moisture can lead to corrosion.

Additionally, lighting components for flight line use must be as stably mounted as possible because of high winds (e.g., 20-25 miles per hour) because of the open areas associated with landing strips.

It is desirable to have a dual mode portable lighting system which is designed to maximize batter life and improve the reliability of the device in a range of outdoor environments.

It is desirable to have a dual mode portable lighting system and which is stably mounted using a low center of gravity, and is designed to minimize wind resistance and surface area exposed to wind which can make the device prone to tipping.

It is further desirable to have a device which can be set up and removed as conveniently as possible, and which uses a minimum number of hinged components subject to rust and/or wear.

It is further desirable to have a dual mode portable lighting system which minimizes required storage space.

GLOSSARY

As used herein, the term "quadpod" refers to a four legged stand which resembles a traditional tripod. In various embodiments, a quadpod may constructed of composite material, fiberglass, aluminum, plastic tubing, or another suitable material.

As used herein, the term "candela" refers to the SI base unit of luminous intensity, i.e., power emitted by a light source in a particular direction, weighted by the luminosity function (a standardized model of the sensitivity of the human eye to different wavelengths). Candela is defined by a description of a physical process that will produce one candela of luminous intensity.

As used herein, the term "housing" refers to a protective component.

As used herein, the term "collar mechanism" refers to a component surrounding a center post.

As used herein, the term "foot" refers to the angled bottom surface of the legs of a quadpod.

As used herein, the term "self-leveling foot" refers to a foot of a quadpod leg which is angled to rest stably on ground surfaces.

As used herein, the term "locking base support bar" refers to a substantially horizontal bar that locks.

As used herein, the term "suspended" means supported vertically.

As used herein, the term "telescoping" means capable of being adjusted in length by slidably moving one component within another.

SUMMARY OF THE INVENTION

The invention is an improved portable lighting system having the following characteristics: a unique quadpod design offering advantages of stability, manufacturing simplification and storage efficiency over the traditional three-legged tripod or prior "sawhorse" design and an encased battery which is protected from the elements.

The present invention is a portable lighting system comprised of a light head with visible white light and infrared light sources mounted on the center post of a quadpod. The four adjustable legs of the quadpod are affixed to the center post using a collar mechanism. The collar mechanism allows the quadpod legs to be pivoted to a parallel position for storage. The adjustable legs have a foot with an angled bottom surface which may also be capable of pivoting and self-leveling. A locking base support bar may also be included for additional stability.

A power unit, which includes a battery encased in a battery housing, is located near the opposite end of the center post. A power cable connects the light head and the power unit. The portable lighting system also includes a radio controller and is capable of being operating wirelessly using a handheld remote. The portable lighting system may be constructed from fiberglass, aluminum, a composite material or any other material or combination of materials.

BRIEF DESCRIPTION OF THE DRAWINGS

Referring now to the drawings.

DETAILED DESCRIPTION OF THE DRAWINGS

Figure 1B:
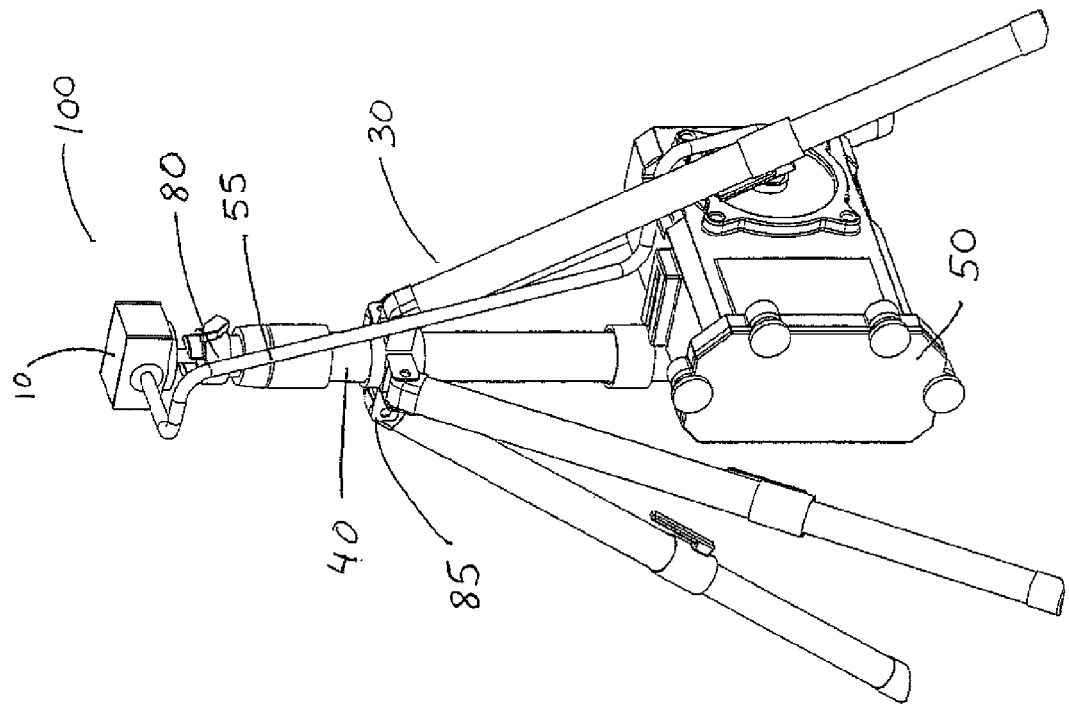
FIGS. 1A and 1B show a side perspective view of one embodiment of a portable lighting system.
Figure 1A:
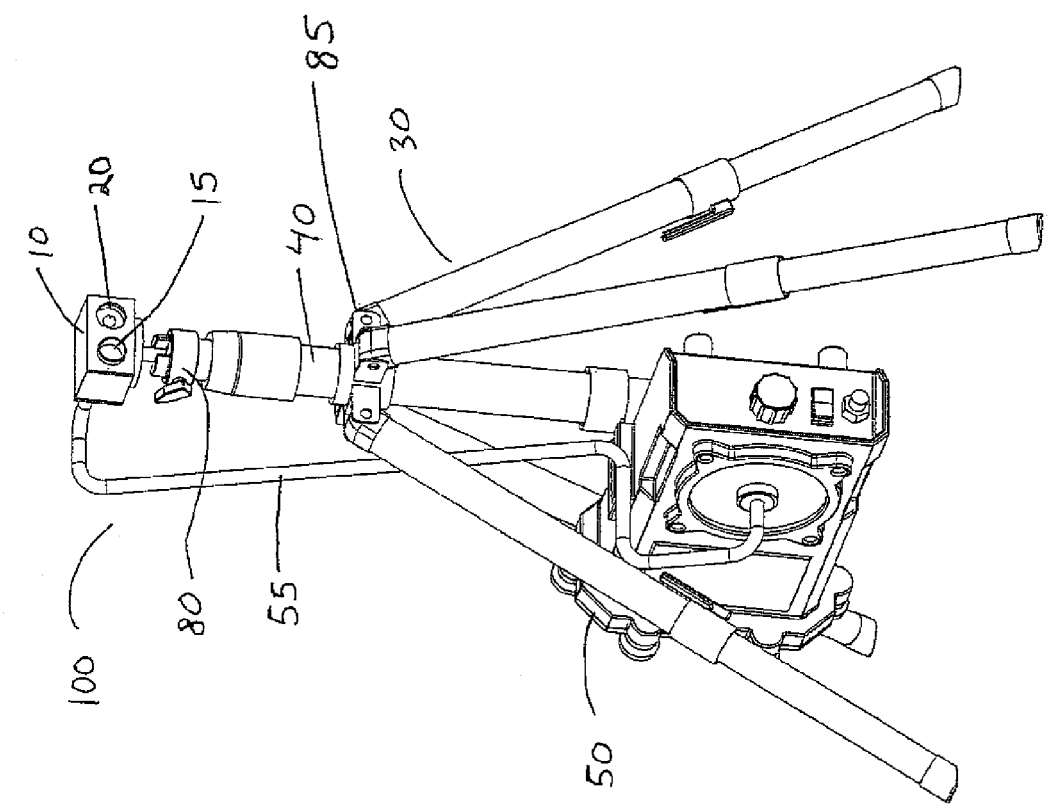

FIGS. 1A and 1B show a side perspective view-of one embodiment of portable lighting system 100. In the embodiment shown, low intensity light head 10 is positioned on quadpod 30. In the embodiment shown, quadpod 30 has a height of 2 feet. In other embodiments, the height of quadpod 30 is a height other than 2 feet. The light head 10 contains an infrared source LED 15, which illuminates an area for use with night vision goggles, and a visible LED light 20. Light head 10 is mounted on a center post 40 and is connected to power unit 50 via power cable 55. Power cable 55 has connectors that are sealed from the environment.

Power unit 50 is mounted near the bottom of center post 40 which allows power unit 50 to be positioned along the centerline of portable lighting system 100 and near the ground lowering the center of gravity resulting in greater stability. Power unit 50 contains a power supply 60 (not shown), radio controller 65 (not shown), and environmentally sealed battery 70 (not shown). Battery 70 is sealed to IP67 standards; therefore, it is completely protected from dust and is capable of being immersed in water to a depth of 1 m.

The embodiment of portable lighting system 100 shown has a ball swivel head 80 located below light head 10 which allows the user to adjust the light angle. In the embodiment shown, quadpod 30 is constructed of composite material to provide low weight and high strength. Quadpod 30 has adjustable legs which provide stability on uneven terrain and keep portable lighting system 100 level. Quadpod 30 also has a collar mechanism 85 which allows for quick setup and easy folding for storage while keeping quadpod 30 as a single component with no disassembly needed.

Figures 2A, 2B:
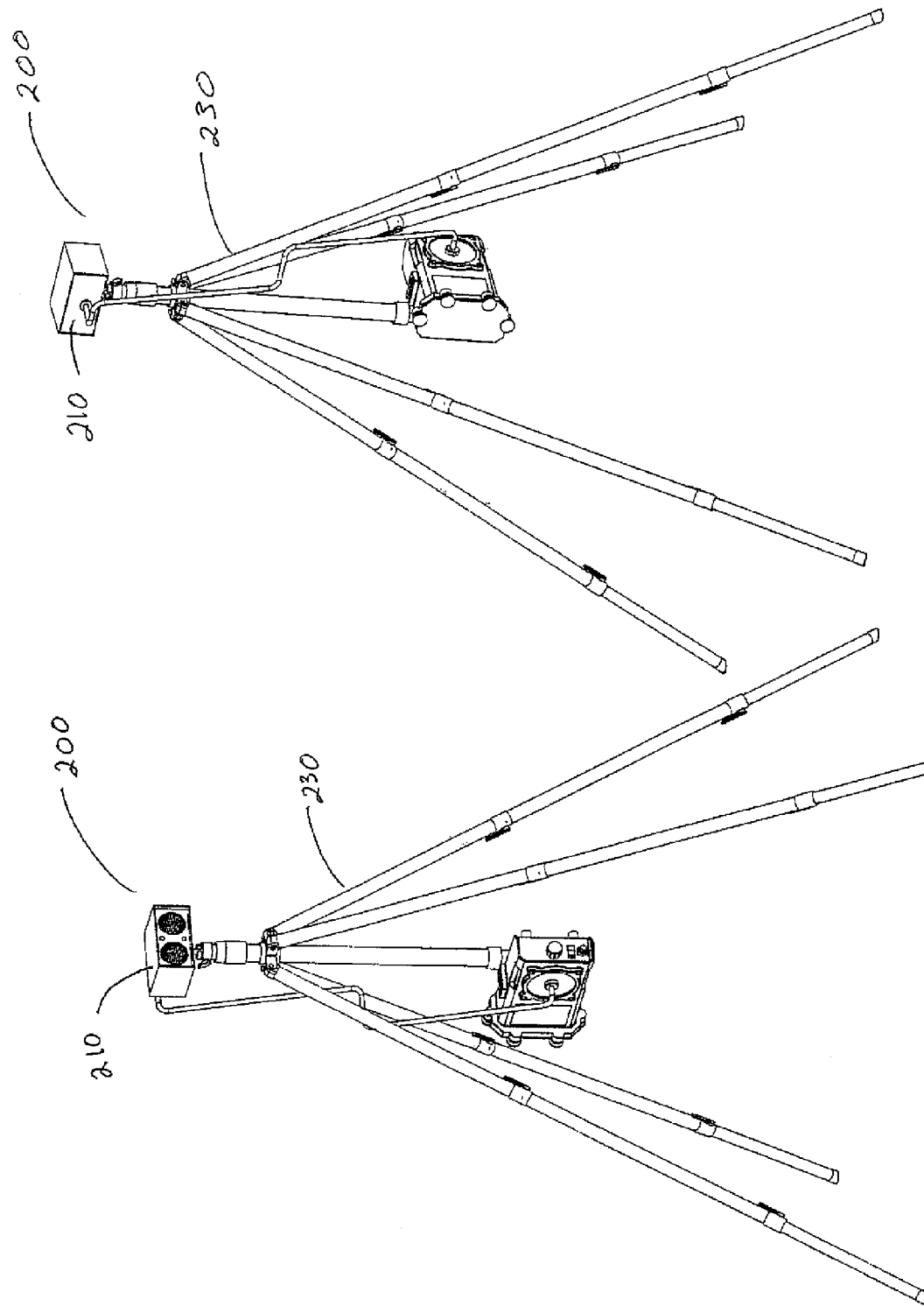
FIGS. 2A and 2B show a side perspective view of an alternate embodiment of a portable lighting system.

FIGS. 2A and 2B show a side perspective view of another embodiment of portable lighting system 200. The embodiment shown has a high intensity light head 210 positioned on quadpod 230. In the embodiment shown, quadpod 230 has a height of 5 feet. In other embodiments, quadpod 230 may be a height other than 5 feet.

Figure 3:
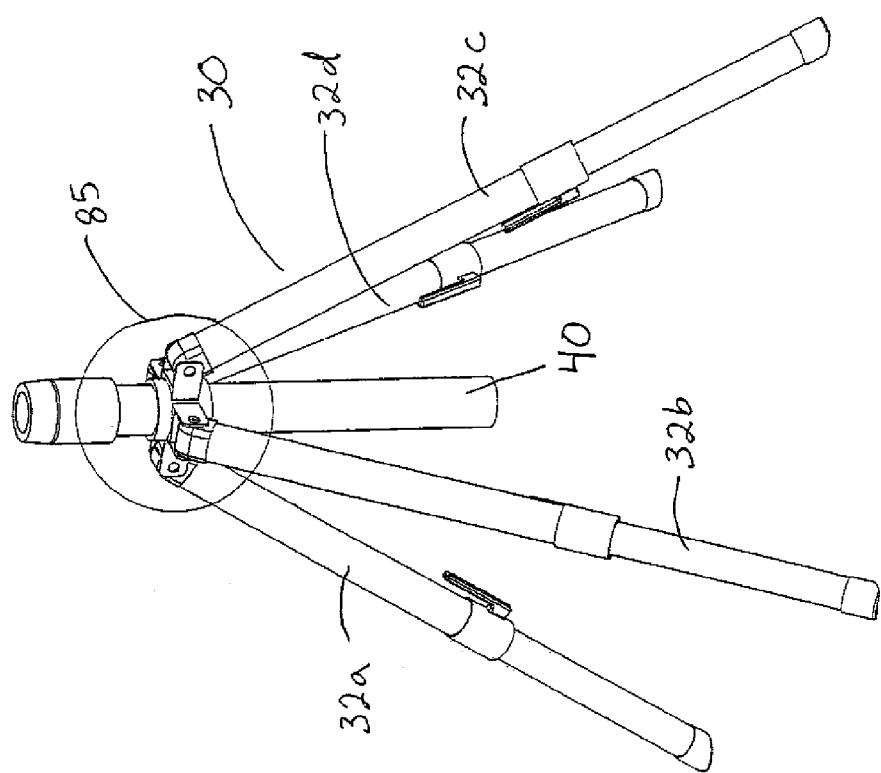
FIG. 3 shows a side perspective view of a quadpod with legs extended.

FIG. 3 shows a side perspective View of quadpod 30 with legs 32a, 32b, 32c, 32d extended. Also shown are collar mechanism 85 and center post 40.

Figure 4:
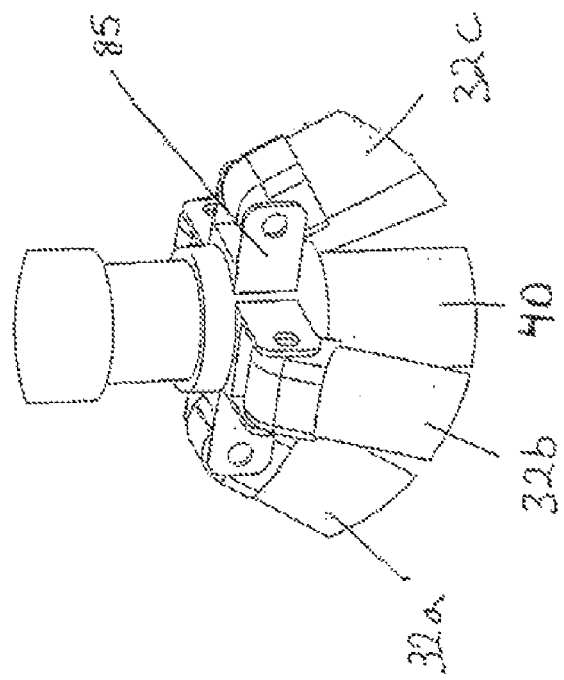
FIG. 4 shows an exploded view of a collar mechanism.

FIG. 4 shows an exploded view of collar mechanism 85. Collar mechanism 85 is used to support the quadpod legs 32a, 32b, 32c, 32d (32d not shown). Collar mechanism 85 affixes quadpod legs 32a, 32b, 32c, 32d to center post 40. Collar mechanism 85 can be manufactured from plastic, aluminum, steel, or any other suitable material.

Figure 5:
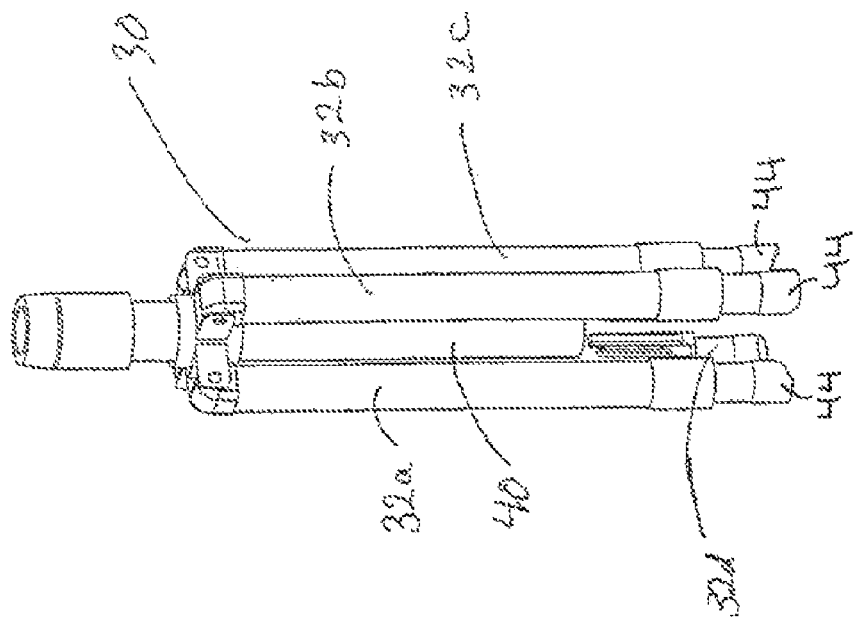
FIG. 5 shows a side perspective view of a quadpod with legs pivoted to a parallel position.

FIG. 5 shows a side perspective view of quadpod 30 with legs 32a, 32b, 32c, 32d folded for storage around center post 40. Visible on quadpod 30 are angled feet 44.

Figure 6:
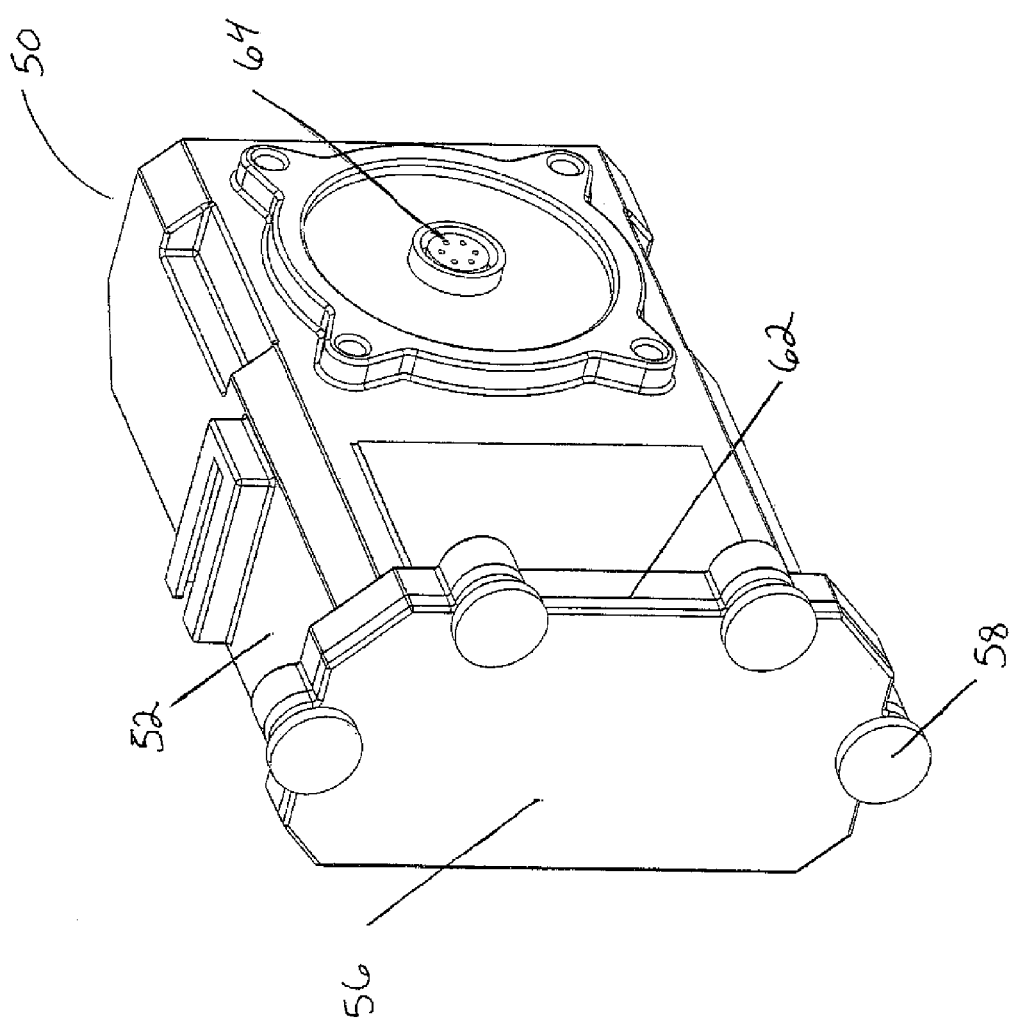
FIG. 6 shows an exploded view of a power unit.

FIG. 6 shows an exploded view of power unit 50. In the embodiment shown, power unit housing 52 is made of a light weight composite and has an environmentally sealed power connector 54. Power unit 50 contains battery 70 (not shown), which is protected from the environment by power unit housing 52. Battery 70 is placed into and removed from power unit 50 via battery door 56. Battery door 56 is secured using screws 58. Gasket 62 provides an environmental seal between the power unit housing 52 and battery door 56. Power cable 55 (not shown) connects to power unit 50 via power connector 64. Power connector 64 is also sealed from the environment.

Figure 7:
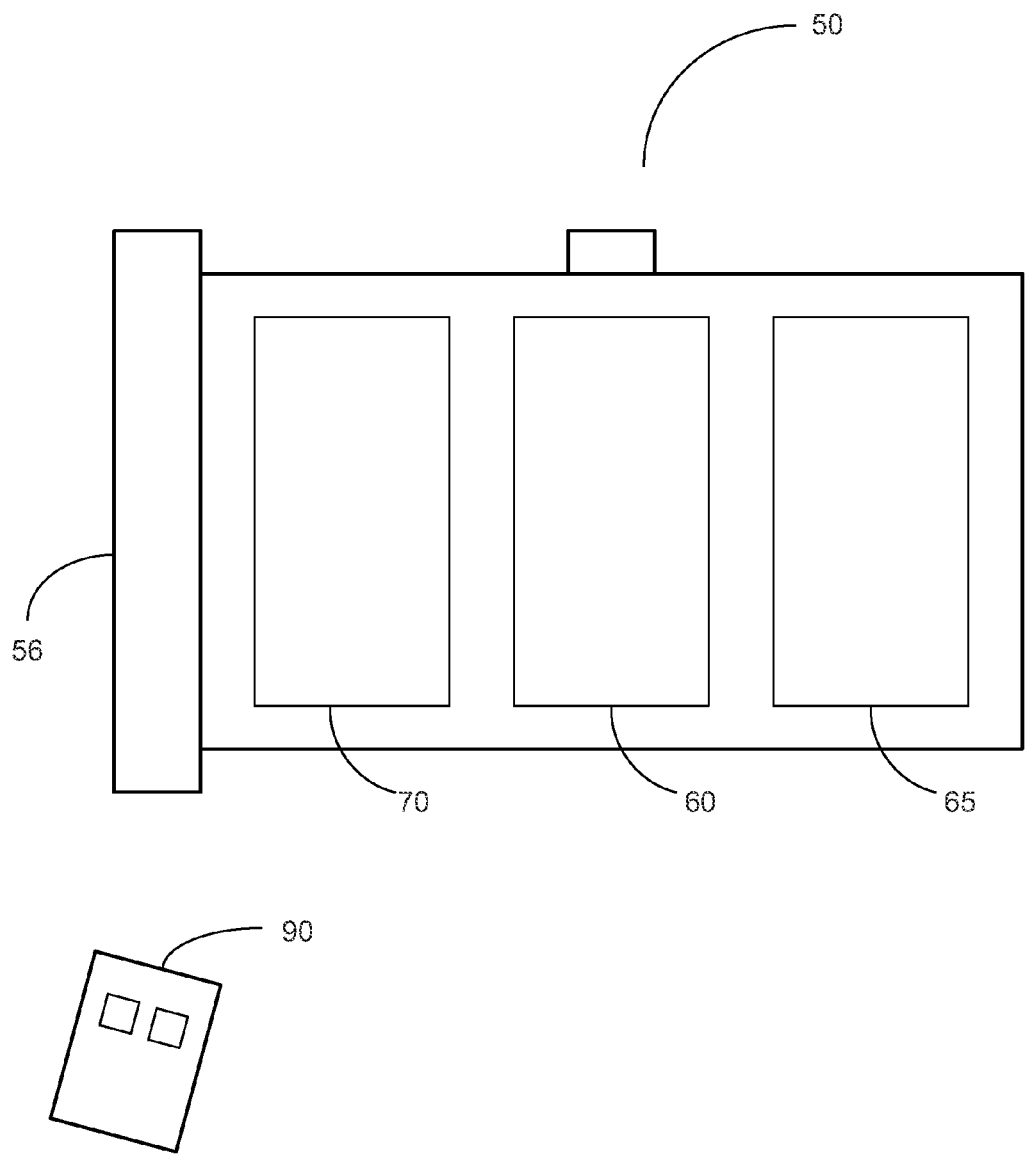
FIG. 7 illustrates the interior of an exemplary embodiment of power unit.

FIG. 7 illustrates the interior of an exemplary embodiment of power unit 50. Power unit 50 contains battery 70, power supply 60 and radio controller 65 adapted to receive signals from hand-held remote 90. In the exemplary embodiment shown in FIG. 7, power supply 60 is an AC/DC power supply. In further exemplary embodiments, power supply 60 may be an additional or back-up battery, an AC power supply, DC power supply, or any other device known in the art to convert one form of electrical energy into another form to be used by power supply 50.

What is claimed is:
1. A landing strip lighting device consisting of:
a light head with visible white light and infrared light sources, wherein said infrared light source is calibrated to a wavelength visible with night vision goggles;

a power unit comprised of a battery fully encased within a weather resistant housing with a battery door and a gasket;

a sealed power cable connecting said light head to said power unit;

a quadpod having at least four adjustable legs, each of said four adjustable legs including a non-pivotal single-structure foot with an angled bottom surface, and a center post wherein said light head is mounted at one end of said center post with a ball swivel head and said power unit is mounted at the opposite end of said center post;

a collar mechanism for pivotally mounting said four adjustable legs to said center post immediately below said light head to create a single structure;

a radio controller; and a handheld remote capable of wireless remote operation;

wherein said weather resistant battery housing is suspended on said center post and the weight of said battery and said battery housing are centered at the center of said four adjustable legs.

2. The device of claim 1, which is constructed of fiberglass.

3. The device of claim 1, which is constructed of aluminum.

4. The device of claim 1 which is constructed of composite material.

5. The device of claim 1, which further includes and at least one remote control receiver fully encased within said battery housing.

6. The device of claim 1, wherein said four adjustable legs may be pivoted to a parallel position for storage.

7. The device of claim 1, wherein said four adjustable legs are telescoping.

8. A landing strip lighting device consisting of:

a light head consisting of visible white light and infrared light sources wherein said infrared light source is calibrated to a wavelength visible with night vision goggles;

a power unit consisting of a battery, a power supply and at least one remote control receiver, said battery, said power supply and said remote control receiver fully encased within a weather resistant housing with a battery door and a gasket;

a sealed power cable connecting said light head to said power unit;

a quadpod consisting of four adjustable legs, each of said four adjustable legs including a non-pivotal single-structure foot with an angled bottom surface, and a center post wherein said light head is mounted at one end of said center post with a ball swivel head and said power unit is mounted at the opposite end of said center post and wherein the weight of said power unit is centered at the center of said four adjustable legs;

a hinge/collar mechanism for pivotally mounting said four adjustable legs to said center post immediately below said light head to create a single structure;

a radio controller; and a handheld remote capable of wireless remote operation.

9. The device of claim 8, wherein said quadpod is constructed from at least one material selected from a group consisting of wood, metal, aluminum, fiberglass, steel, alloy, plastic and rubber.

10. A landing strip lighting device consisting of:

a light head consisting of visible white light and infrared light sources wherein said infrared light source is calibrated to a wavelength visible with night vision goggles;

a power unit consisting of a battery fully encased within a weather resistant housing with a battery door and a gasket;

a sealed power cable connecting said light head to said power unit;

a quadpod consisting of four pivotable, telescoping legs, each of said four pivotable, telescoping legs including a non-pivotal single-structure foot with a angled bottom surface, and a center post wherein said light head is mounted at one end of said center post with a ball swivel head and said power unit is mounted at the opposite end of said center post and wherein the weight of said power unit is centered at the center of said four pivotable, telescoping legs, said four pivotable, telescoping legs further being capable of being partially pivoted to a position parallel to each other for storage;

a hinge/collar mechanism for pivotally mounting said four pivotable, telescoping legs to said center post immediately below said light head to create a single structure;

a radio controller; and a handheld remote capable of wireless remote operation.

\* \* \* \* \*